(12) United States Patent
Liu et al.

(10) Patent No.: US 10,187,173 B2
(45) Date of Patent: Jan. 22, 2019

(54) WAVELENGTH SELECTIVE SWITCH AND OPTICAL SIGNAL TRANSMISSION SYSTEM

(71) Applicant: HUAWEI TECHNOLOGIES CO., LTD., Shenzhen, Guangdong (CN)

(72) Inventors: Heliang Liu, Wuhan (CN); Binghua Zhang, Wuhan (CN); Junzi Lian, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/824,126

(22) Filed: Nov. 28, 2017

(65) Prior Publication Data

US 2018/0152259 A1 May 31, 2018

(30) Foreign Application Priority Data

Nov. 29, 2016 (CN) .......................... 2016 1 1072488

(51) Int. Cl.
| | |
|---|---|
| *G02B 6/02* | (2006.01) |
| *G02B 6/35* | (2006.01) |
| *G02B 6/293* | (2006.01) |
| *H04J 14/02* | (2006.01) |
| *H04B 10/073* | (2013.01) |
| *H04B 10/077* | (2013.01) |

(Continued)

(52) U.S. Cl.
CPC ........ *H04J 14/0212* (2013.01); *G02B 6/0208* (2013.01); *G02B 6/29317* (2013.01); *G02B 6/29383* (2013.01); *G02B 6/356* (2013.01); *G02B 6/3518* (2013.01); *H04B 10/073* (2013.01); *H04B 10/0779* (2013.01); *H04B 10/07957* (2013.01); *G02F 2203/585* (2013.01)

(58) Field of Classification Search
None
See application file for complete search history.

(56) References Cited

U.S. PATENT DOCUMENTS

| | | | |
|---|---|---|---|
| 2010/0221004 A1* | 9/2010 | Haslam | H04J 14/0201 398/49 |
| 2014/0348464 A1 | 11/2014 | Kamura et al. | |

(Continued)

OTHER PUBLICATIONS

Extended European Search Report, dated Mar. 22, 2018, in European Application No. 17204268.1 (8 pp.).

*Primary Examiner* — Darren E Wolf
(74) *Attorney, Agent, or Firm* — Staas & Halsey LLP

(57) ABSTRACT

In the wavelength selective switch provided in the present invention, at least one optical element is successively arranged in the wavelength selective switch according to a sequence of processing optical signals. The at least one optical element receives a service optical signal from a service laser, receives a monitoring optical signal from a monitoring laser, and performs same optical signal processing on the service optical signal and the monitoring optical signal according to a processing function of the at least one optical element, where a wavelength of the service optical signal and a wavelength of the monitoring optical signal are different. A service optical signal processed by the at least one optical element and a monitoring optical signal processed by at least one optical element are output, where the monitoring optical signal processed by the at least one optical element is used for monitoring performance of the wavelength selective switch.

15 Claims, 7 Drawing Sheets

(51) Int. Cl.
*H04B 10/079* (2013.01)
*H04B 10/40* (2013.01)
*H04B 10/50* (2013.01)
*H04B 10/60* (2013.01)

(56) References Cited

U.S. PATENT DOCUMENTS

2014/0363162 A1* 12/2014 Chu ................ B82Y 20/00
  398/49
2015/0208146 A1   7/2015 Younce et al.
2016/0099851 A1   4/2016 Archambault et al.
2016/0323034 A1* 11/2016 Wagener ............. H04J 14/0212

* cited by examiner

WAVELENGTH SELECTIVE SWITCH AND OPTICAL SIGNAL TRANSMISSION SYSTEM

CROSS-REFERENCE TO RELATED APPLICATION

This application claims priority to Chinese Patent Application No. 201611072488.4, filed on Nov. 29, 2016, which is hereby incorporated by reference in its entirety.

TECHNICAL FIELD

The present invention relates to the field of optical communications technologies, and in particular, to a wavelength selective switch and an optical signal transmission system.

BACKGROUND

A reconfigurable optical add/drop multiplexer (ROADM) can remotely implement dynamical switching of an add/drop optical wavelength of a service optical signal by means of software grooming, so that a fiber connection does not need to be manually changed at a station, thereby significantly reducing operating costs of an entire system. The service optical signal is an optical signal that is transmitted by the ROADM and that carries service information. Currently, the ROADM has been widely applied to key network nodes, and therefore, performance of the ROADM is crucial to reliability and maintainability of an existing network. The ROADM may complete adding/dropping of an optical path on one node, and implement grooming of wavelength-level cross-connections passing through an optical path.

Generally, a currently-used ROADM is implemented by using a wavelength selective switch (WSS). The WSS is an ROADM subsystem technology that develops rapidly in recent years. The WSS features a wide frequency band and low dispersion, supports independence between a port and a wavelength, that is, any output port of the WSS can transmit an optical signal of any wavelength, and supports a higher dimension. A WSS-based ROADM is gradually becoming a first choice for a high-dimension ROADM.

In the prior art, an optical splitter is disposed at an output fiber port of the WSS, and by using the optical splitter, a few optical signals are split from service optical signals that are output from the output fiber port. The split optical signals are input to a detector, so as to monitor performance of the WSS. In this solution, some optical signals can be split only when there are service optical signals that are output from the output fiber port, and the performance of the WSS is monitored by using the split optical signals. When no service optical signal is transmitted at the output fiber port of the WSS, the performance of the WSS cannot be monitored. In the prior art, monitoring the performance of the WSS depends on the service optical signal that is input to the WSS, and consequently, the performance cannot be monitored when no service optical signal is input to the WSS.

SUMMARY

Embodiments of the present invention provide a wavelength selective switch and an optical signal transmission system, so that performance of a wavelength selective switch can be monitored when no service optical signal is input to the wavelength selective switch.

To resolve the foregoing technical problem, the embodiments of the present invention provide the following technical solutions:

According to a first aspect, an embodiment of the present invention provides a wavelength selective switch, where at least one optical element is disposed in the wavelength selective switch, and the at least one optical element is successively arranged in the wavelength selective switch according to a sequence of processing optical signals; a service optical signal transmitted by a service laser and a monitoring optical signal transmitted by a monitoring laser are separately input to the at least one optical element, and a wavelength of the service optical signal and a wavelength of the monitoring optical signal are different; the at least one optical element is configured to: receive the service optical signal from the service laser, receive the monitoring optical signal from the monitoring laser, and perform same optical signal processing on the service optical signal and the monitoring optical signal according to a processing function of the at least one optical element, to obtain the service optical signal processed by the at least one optical element and the monitoring optical signal processed by the at least one optical element; and the service optical signal processed by the at least one optical element and the monitoring optical signal processed by the at least one optical element are output, where the monitoring optical signal processed by the at least one optical element is used for monitoring performance of the wavelength selective switch. The at least one optical element in the wavelength selective switch not only receives the service optical signal transmitted by the service laser, but also receives the monitoring optical signal transmitted by the monitoring laser, so that both the monitoring optical signal and the service optical signal are input to the at least one optical element. The at least one optical element performs same optical signal processing on the service optical signal and the monitoring optical signal, so that an optical performance change of the wavelength selective switch may be analyzed according to a result of detecting the monitoring optical signal. In this embodiment of the present invention, monitoring the performance of the wavelength selective switch does not depend on inputting of the service optical signal, and therefore, the performance of the wavelength selective switch can be monitored when no service optical signal is input to the wavelength selective switch.

With reference to the first aspect, in a first possible implementation of the first aspect, the wavelength selective switch includes a first input port and a second input port; the first input port and the second input port are separately connected to a first optical element of the at least one optical element; and the service optical signal transmitted by the service laser is input to the first optical element of the at least one optical element by using the first input port, and the monitoring optical signal transmitted by the monitoring laser is input to the first optical element of the at least one optical element by using the second input port. The at least one optical element is connected to both the first input port and the second input port, and the two input ports are respectively used for inputting different optical signals. Therefore, the at least one optical element may receive the service optical signal and the monitoring optical signal at the same time by using the first input port and the second input port.

With reference to the first aspect, in a second possible implementation of the first aspect, the wavelength selective switch has an input port, a first optical element of the at least one optical element is connected to the input port, and the input port is connected to an optical filter; the service optical signal transmitted by the service laser and the monitoring optical signal transmitted by the monitoring laser are separately input to the optical filter; and the optical filter is configured to: after receiving the service optical signal and the monitoring optical signal, send the service optical signal and the monitoring optical signal to the first optical element of the at least one optical element by using the input port. The monitoring optical signal and the service optical signal have different wavelengths, so that the monitoring optical signal may be distinguished from the service optical signal according to the different wavelengths. The optical filter combines the service optical signal and the monitoring optical signal, and then the optical filter inputs the service optical signal and the monitoring optical signal to the first optical element of the at least one optical element by using the input port. The service optical signal and the monitoring optical signal may be input at the same time without adding an input port.

With reference to the first aspect, in a third possible implementation of the first aspect, the wavelength selective switch includes a first output port and a second output port, and a last optical element of the at least one optical element is connected to the first output port and the second output port; and the service optical signal processed by the at least one optical element is output by using the first output port, and the monitoring optical signal processed by the at least one optical element is output by using the second output port. The at least one optical element is connected to both the first output port and the second output port, and the two output ports are respectively used for outputting different optical signals. Therefore, the service optical signal and the monitoring optical signal may be respectively output by using the first output port and the second output port.

With reference to the first aspect, in a fourth possible implementation of the first aspect, the wavelength selective switch has an output port, and a last optical element of the at least one optical element is connected to the output port; and the service optical signal processed by the at least one optical element and the monitoring optical signal processed by the at least one optical element are output by using the output port.

With reference to the fourth possible implementation of the first aspect, in a fifth possible implementation of the first aspect, the output port of the wavelength selective switch is connected to an optical signal connection module, or the output port of the wavelength selective switch is connected to an optical signal processing module; the optical signal connection module or the optical signal processing module is connected to an optical filter; and the optical filter is configured to: receive, from the optical signal connection module, the service optical signal and the monitoring optical signal that are output by the optical signal connection module, or receive, from the optical signal processing module, the service optical signal and the monitoring optical signal that are processed by the optical signal processing module, split the received service optical signal from the received monitoring optical signal, and output the split monitoring optical signal. The optical filter is configured to: receive, by using the optical signal connection module or the optical signal processing module, the service optical signal processed by the at least one optical element and the monitoring optical signal processed by the at least one optical element, split the received service optical signal from the received monitoring optical signal, and output the split monitoring optical signal. The split monitoring optical signal that is output may be used for monitoring performance of the optical signal connection module or the optical signal processing module.

With reference to any one of the first aspect or the first possible implementation to the fifth possible implementation of the first aspect, in a sixth possible implementation of the first aspect, the wavelength selective switch further includes a optical detector and a monitoring module, the optical detector is connected to the last optical element of the at least one optical element, and the monitoring module is connected to the optical detector; the optical detector is configured to perform optical power detection on the monitoring optical signal processed by the at least one optical element, to obtain an optical power detection value of the monitoring optical signal; and the monitoring module is configured to: obtain the optical power detection value of the monitoring optical signal from the optical detector, obtain a flare central location of the monitoring optical signal according to the optical power detection value of the monitoring optical signal, compare the flare central location of the monitoring optical signal with a preset flare central initial location, to determine a central frequency offset of the wavelength selective switch, and compensate for the central frequency offset of the wavelength selective switch.

With reference to the sixth possible implementation of the first aspect, in a seventh possible implementation of the first aspect, the monitoring module is further configured to send a frequency offset prompt message when the central frequency offset exceeds a frequency offset threshold. In this embodiment of the present invention, the optical detector and the monitoring module are disposed in the wavelength selective switch, so that a central frequency offset monitoring function and an alarm indication function of the wavelength selective switch may be implemented.

With reference to the sixth possible implementation of the first aspect, in an eighth possible implementation of the first aspect, the monitoring module is further configured to: obtain the optical power detection value of the monitoring optical signal from the optical detector, and compare the optical power detection value of the monitoring optical signal with an optical power initial value of the monitoring optical signal that is input to the wavelength selective switch, to determine an insertion loss of the wavelength selective switch.

With reference to the eighth possible implementation of the first aspect, in a ninth possible implementation of the first aspect, the monitoring module is further configured to send an insertion loss prompt message when the insertion loss exceeds an insertion loss threshold. In this embodiment of the present invention, the optical detector and the monitoring module are disposed in the wavelength selective switch, so that an insertion loss monitoring function and an alarm indication function of the wavelength selective switch may be implemented.

According to a second aspect, an embodiment of the present invention further provides an optical signal transmission system, where the optical signal transmission system includes a first wavelength selective switch, a second wavelength selective switch, and an optical signal connection module, or the optical signal transmission system includes the first wavelength selective switch, the second wavelength selective switch, and an optical signal processing module, and the first wavelength selective switch and the second wavelength selective switch are the wavelength selective switch according to any one of the implementations of the first aspect; the optical signal connection module is separately connected to the first wavelength selective switch and the second wavelength selective switch, or the optical signal processing module is separately connected to the first wavelength selective switch and the second wavelength selective switch; the optical signal connection module is connected to the first wavelength selective switch by using a first fiber, and is connected to the second wavelength selective switch by using a second fiber, or the optical signal processing module is connected to the first wavelength selective switch by using a first fiber, and is connected to the second wavelength selective switch by using a second fiber; and a service optical signal transmitted by a service laser is input to the first wavelength selective switch, a first monitoring optical signal transmitted by a first monitoring laser is input to the first wavelength selective switch, and after being successively processed by the first wavelength selective switch, the optical signal connection module or the optical signal processing module, and the second wavelength selective switch, the service optical signal is output by using the second wavelength selective switch.

With reference to the second aspect, in a first possible implementation of the second aspect, the optical signal transmission system further includes a first optical detector and a first monitoring module, where the first optical detector is configured to: obtain, from the first wavelength selective switch, a first monitoring optical signal processed by the first wavelength selective switch, and perform optical power detection on the first monitoring optical signal processed by the first wavelength selective switch, to obtain a first optical power detection value of the first monitoring optical signal; and the first monitoring module is configured to: obtain the first optical power detection value of the first monitoring optical signal from the first optical detector, obtain a flare central location of the first monitoring optical signal according to the first optical power detection value of the first monitoring optical signal, compare the flare central location of the first monitoring optical signal with a preset flare central initial location, to determine a central frequency offset of the first wavelength selective switch, and compensate for the central frequency offset of the first wavelength selective switch.

With reference to the second aspect, in a second possible implementation of the second aspect, the first monitoring module is further configured to: obtain a first optical power detection value of the first monitoring optical signal from the first optical detector, and compare the first optical power detection value of the first monitoring optical signal with an optical power initial value of the first monitoring optical signal that is input to the first wavelength selective switch to determine an insertion loss of the first wavelength selective switch.

With reference to the second aspect, or the first possible implementation, or the second possible implementation of the second aspect, in a third possible implementation of the second aspect, the optical signal transmission system further includes a second optical detector and a second monitoring module, where the second optical detector is configured to: obtain, from the second wavelength selective switch, a second monitoring optical signal processed by the second wavelength selective switch, where the second monitoring optical signal is transmitted to the second wavelength selective switch by a second monitoring laser, and perform optical power detection on the second monitoring optical signal processed by the second wavelength selective switch, to obtain an optical power detection value of the second monitoring optical signal; and the second monitoring module is configured to: obtain the optical power detection value of the second monitoring optical signal from the second optical detector, and compare the optical power detection value of the second monitoring optical signal with an optical power initial value of the second monitoring optical signal that is input to the second wavelength selective switch, to determine an insertion loss of the second wavelength selective switch.

With reference to the third possible implementation of the second aspect, in a fourth possible implementation of the second aspect, when the optical signal transmission system further includes the first optical detector and the first monitoring module, the first monitoring module establishes a communication connection to the second monitoring module; the first monitoring module is further configured to send the insertion loss of the first wavelength selective switch to the second monitoring module; the second optical detector is further configured to: obtain, from the second wavelength selective switch, a first monitoring optical signal that is successively processed by the first wavelength selective switch, the optical signal connection module or the optical signal processing module, and the second wavelength selective switch, and perform optical power detection on the first monitoring optical signal that is successively processed by the first wavelength selective switch, the optical signal connection module or the optical signal processing module, and the second wavelength selective switch, to obtain a second optical power detection value of the first monitoring optical signal; and the second monitoring module is further configured to: obtain, from the first optical detector, the second optical power detection value of the first monitoring optical signal, compare the second optical power detection value of the first monitoring optical signal with the optical power initial value of the first monitoring optical signal that is input to the first wavelength selective switch, to determine a total insertion loss of the first monitoring optical signal, where the total insertion loss of the first monitoring optical signal includes an insertion loss that is generated after processing performed by the first wavelength selective switch, the optical signal connection module or the optical signal processing module, and the second wavelength selective switch, and calculate an insertion loss of the optical signal connection module or the optical signal processing module according to the total insertion loss of the first monitoring optical signal, the insertion loss of the first wavelength selective switch, and the insertion loss of the second wavelength selective switch. By using the foregoing calculation process executed by the second monitoring module, a fault of the optical signal connection module or the optical signal processing module may be determined, and maintainability of the optical signal transmission system is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings.

DESCRIPTION OF EMBODIMENTS

Figure 1:
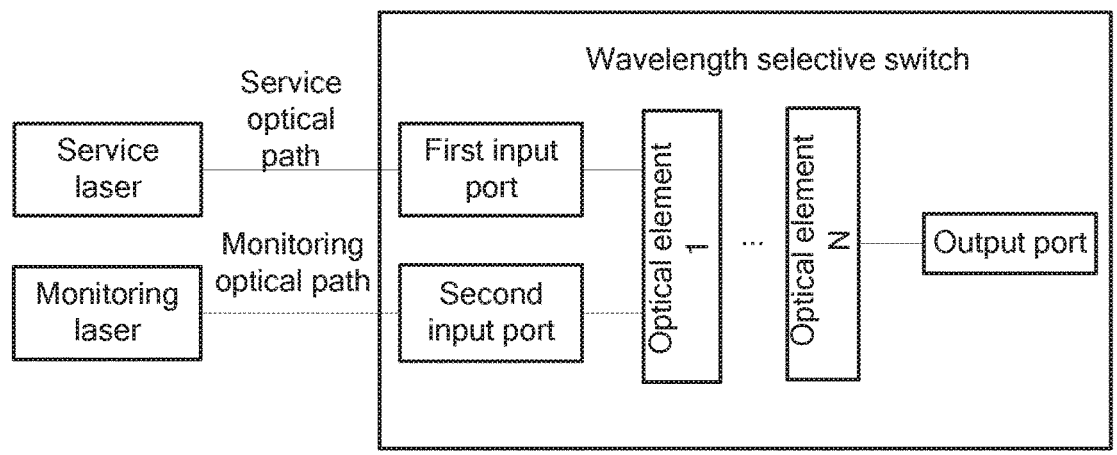
FIG. 1 is a schematic block diagram of a compositional structure of a wavelength selective switch according to an embodiment of the present invention.

Embodiments of the present invention provide a wavelength selective switch and an optical signal transmission system, so that performance of a wavelength selective switch can be monitored when no service optical signal is input to the wavelength selective switch.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Details are separately illustrated in the following. For a wavelength selective switch in an embodiment of the present invention, a monitoring optical signal transmitted by a monitoring laser is input to the wavelength selective switch, so that performance of the wavelength selective switch can be monitored when no service optical signal is input to the wavelength selective switch. At least one optical element is disposed in the wavelength selective switch, and the at least one optical element is successively arranged in the wavelength selective switch according to a sequence of processing optical signals.

A service optical signal transmitted by a service laser and the monitoring optical signal transmitted by the monitoring laser are separately input to the at least one optical element, and a wavelength of the service optical signal and a wavelength of the monitoring optical signal are different.

The at least one optical element is configured to: receive the service optical signal from the service laser, receive the monitoring optical signal from the monitoring laser, and perform same optical signal processing on the service optical signal and the monitoring optical signal according to a processing function of the at least one optical element, to obtain a service optical signal processed by the at least one optical element and a monitoring optical signal processed by the at least one optical element; and the service optical signal processed by the at least one optical element and the monitoring optical signal processed by the at least one optical element are output. The monitoring optical signal processed by the at least one optical element is used for monitoring the performance of the wavelength selective switch.

In this embodiment of the present invention, the at least one optical element in the wavelength selective switch not only receives the service optical signal transmitted by the service laser, but also receives the monitoring optical signal transmitted by the monitoring laser, so that both the monitoring optical signal and the service optical signal are input to the at least one optical element. The at least one optical element performs same optical signal processing on the service optical signal and the monitoring optical signal, so that an optical performance change of the wavelength selective switch may be analyzed according to a result of detecting the monitoring optical signal. In this embodiment of the present invention, monitoring the performance of the wavelength selective switch does not depend on inputting of the service optical signal, and therefore, the performance of the wavelength selective switch can be monitored when no service optical signal is input to the wavelength selective switch.

In this embodiment of the present invention, as an ROADM subsystem, the wavelength selective switch may implement a "reconfigurable" feature of an ROADM. A wavelength switch of the wavelength selective switch can be switched between any input port and output port, so that a networking capability of a dense wavelength division multiplexing device is significantly improved. The optical element of at least one type is disposed in the wavelength selective switch. A type of the optical element disposed in the wavelength selective switch needs to be determined according to a specific application scenario. For example, the wavelength selective switch may be implemented by using a liquid crystal on silicon (LCOS), and in this case, the optical element disposed in the wavelength selective switch may be specifically an LCOS device. The type of the optical element is specifically determined with reference to a specific scenario of the wavelength selective switch, and this is not limited herein. As shown in FIG. 1, description is given by using an example in which a wavelength selective switch includes N optical elements: an optical element 1, ..., an optical element N, where N is a natural number.

In this embodiment of the present invention, both a monitoring optical signal and a service optical signal that enter a wavelength selective switch may be input to at least one optical element. Optical signal processing is performed on the monitoring optical signal and the service optical signal by a same optical element in the wavelength selective switch, so that changes of a central frequency offset and an insertion loss that are caused by the wavelength selective switch are same for the service optical signal and the monitoring optical signal. The central frequency offset change and the insertion loss change that are of the wavelength selective switch may be obtained by analyzing the monitoring optical signal, so that light-splitting processing and analysis do not need to be performed on the service optical signal. The central frequency offset is a change that occurs in a waveform center of the wavelength selective switch in terms of time, and the insertion loss is a change that occurs in optical power of an optical signal after the optical signal passes through the wavelength selective switch.

It should be noted that in the foregoing embodiment of the present invention, a service laser and a monitoring laser are shown in FIG. 1 as an example. The service laser may be connected to the wavelength selective switch by using an input fiber, and a service optical signal generated by the service laser is input to the wavelength selective switch. The monitoring laser is connected to the wavelength selective switch, and a monitoring optical signal generated by the monitoring laser is input to the wavelength selective switch. The monitoring laser may be specifically disposed inside the wavelength selective switch, or the monitoring laser may be disposed outside the wavelength selective switch, and this is not specifically limited herein.

In some embodiments of the present invention, referring to FIG. 1, the wavelength selective switch includes a first input port and a second input port.

The first input port and the second input port are separately connected to a first optical element of the at least one optical element.

The service optical signal transmitted by the service laser is input to the first optical element of the at least one optical element by using the first input port, and the monitoring optical signal transmitted by the monitoring laser is input to the first optical element of the at least one optical element by using the second input port.

In this embodiment of the present invention, the at least one optical element is disposed in the wavelength selective switch, the at least one optical element is connected to both the first input port and the second input port, and the two input ports are respectively used for inputting different optical signals. Therefore, the at least one optical element may receive the service optical signal and the monitoring optical signal at the same time by using the first input port and the second input port. Same optical signal processing is performed on the service optical signal and the monitoring optical signal by the at least one optical element according to the processing function of the at least one optical element, and the service optical signal processed by the at least one optical element and the monitoring optical signal processed by the at least one optical element may be obtained. In this embodiment of the present invention, the monitoring optical signal that is input to the wavelength selective switch is independent of the service optical signal, and same optical path processing is performed on the monitoring optical signal and the service optical signal inside the wavelength selective switch. Therefore, light splitting does not need to be performed on the service optical signal, and the monitoring optical signal may be input when no service optical signal is input to the wavelength selective switch. The monitoring optical signal and the service optical signal are processed by a same optical element, the service optical signal does not need to be analyzed, and the optical performance of the wavelength selective switch may be obtained by analyzing the monitoring optical signal. Therefore, by analyzing the monitoring optical signal that is output by the wavelength selective switch, the performance of the wavelength selective switch can be monitored when no service optical signal is input.

Figure 2:
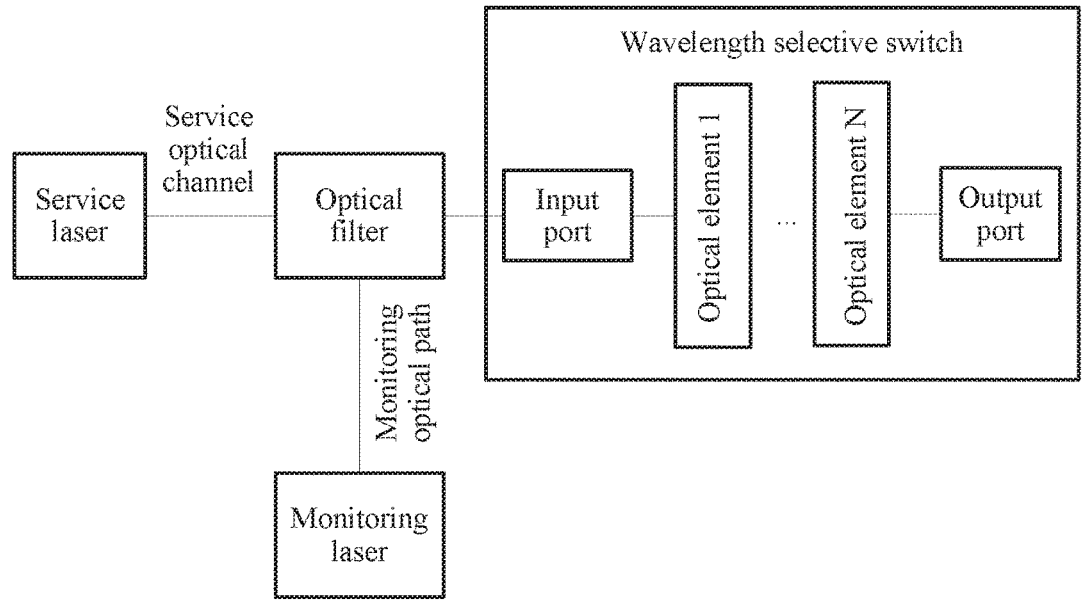
FIG. 2 is a schematic block diagram of a compositional structure of another wavelength selective switch according to an embodiment of the present invention.

In some embodiments of the present invention, referring to FIG. 2, the wavelength selective switch has an input port, a first optical element of the at least one optical element is connected to the input port, and the input port is connected to an optical filter.

The service optical signal transmitted by the service laser and the monitoring optical signal transmitted by the monitoring laser are separately input to the optical filter.

The optical filter is configured to: after receiving the service optical signal and the monitoring optical signal, send the service optical signal and the monitoring optical signal to the first optical element of the at least one optical element by using the input port.

The service optical signal may be input to the optical filter by using a service optical path, and the monitoring optical signal may be input to the optical filter by using a monitoring optical path. The service optical signal is an optical signal used to carry service data, and the wavelength selective switch may process the service optical signal and then output the service optical signal to another component connected to the wavelength selective switch. The monitoring optical signal is an optical signal used for monitoring performance of a device, and in this embodiment of the present invention, the monitoring optical signal is input to the wavelength selective switch. The monitoring optical signal and the service optical signal have different wavelengths, so that the monitoring optical signal may be distinguished from the service optical signal according to the different wavelengths. The optical filter combines the service optical signal and the monitoring optical signal, and then the optical filter inputs the service optical signal and the monitoring optical signal to the first optical element of the at least one optical element by using the input port. In this embodiment of the present invention, the service optical signal and the monitoring optical signal may be input at the same time without adding an input port.

Figure 3:
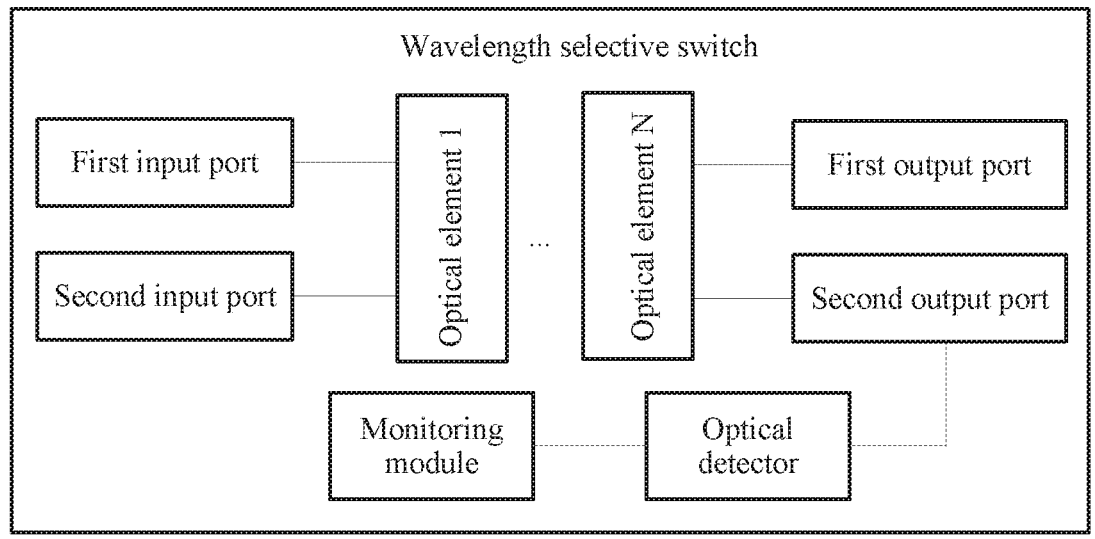
FIG. 3 is a schematic block diagram of a compositional structure of another wavelength selective switch according to an embodiment of the present invention.

In some embodiments of the present invention, referring to FIG. 3, the wavelength selective switch includes a first output port and a second output port, and a last optical element of the at least one optical element is connected to the first output port and the second output port.

The service optical signal processed by the at least one optical element is output by using the first output port, and the monitoring optical signal processed by the at least one optical element is output by using the second output port.

The at least one optical element is disposed in the wavelength selective switch, the at least one optical element is connected to both the first output port and the second output port, and the two output ports are respectively used for outputting different optical signals. Therefore, the service optical signal and the monitoring optical signal may be respectively output by using the first output port and the second output port. For example, the service optical signal processed by the at least one optical element is output by using the first output port, and the monitoring optical signal processed by the at least one optical element is output by using the second output port.

Figure 4:
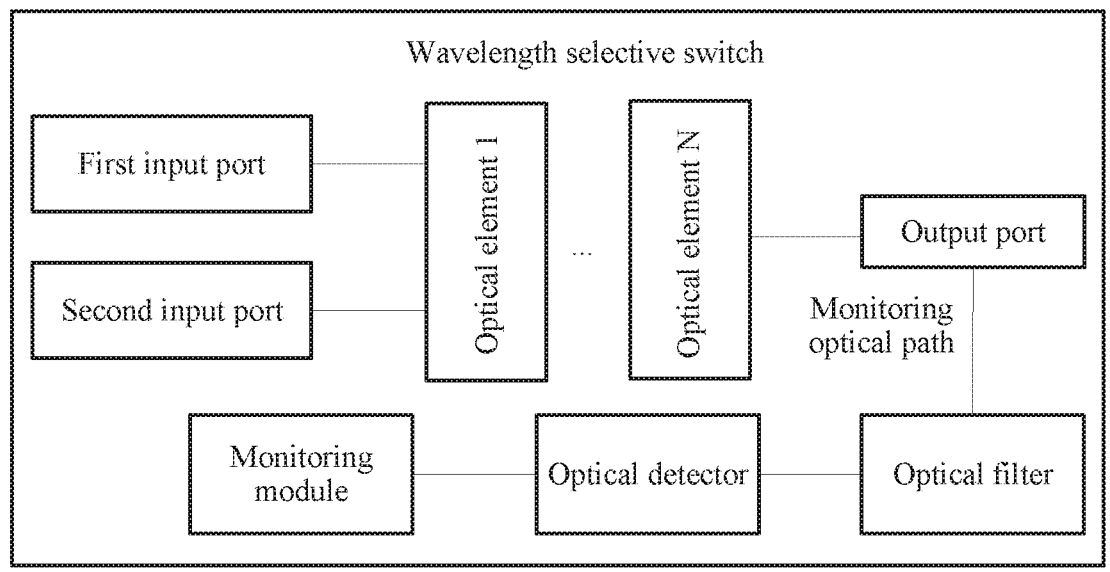
FIG. 4 is a schematic block diagram of a compositional structure of another wavelength selective switch according to an embodiment of the present invention.

In some other embodiments of the present invention, referring to FIG. 4, the wavelength selective switch has an output port, and a last optical element of the at least one optical element is connected to the output port.

The service optical signal processed by the at least one optical element and the monitoring optical signal processed by the at least one optical element are output by using the output port.

The wavelength selective switch may have only one output port, and in this case, the service optical signal and the monitoring optical signal may be output by using the common output port. The output port is connected to an optical filter, and the optical filter separates the monitoring optical signal processed by the at least one optical element, and sends the monitoring optical signal to a optical detector by using a monitoring optical path. For details, refer to description in a subsequent embodiment. In this embodiment of the present invention, the service optical signal and the monitoring optical signal may be output at the same time without adding an output port, and the monitoring optical signal may be used for monitoring the performance of the wavelength selective switch.

Figure 5:
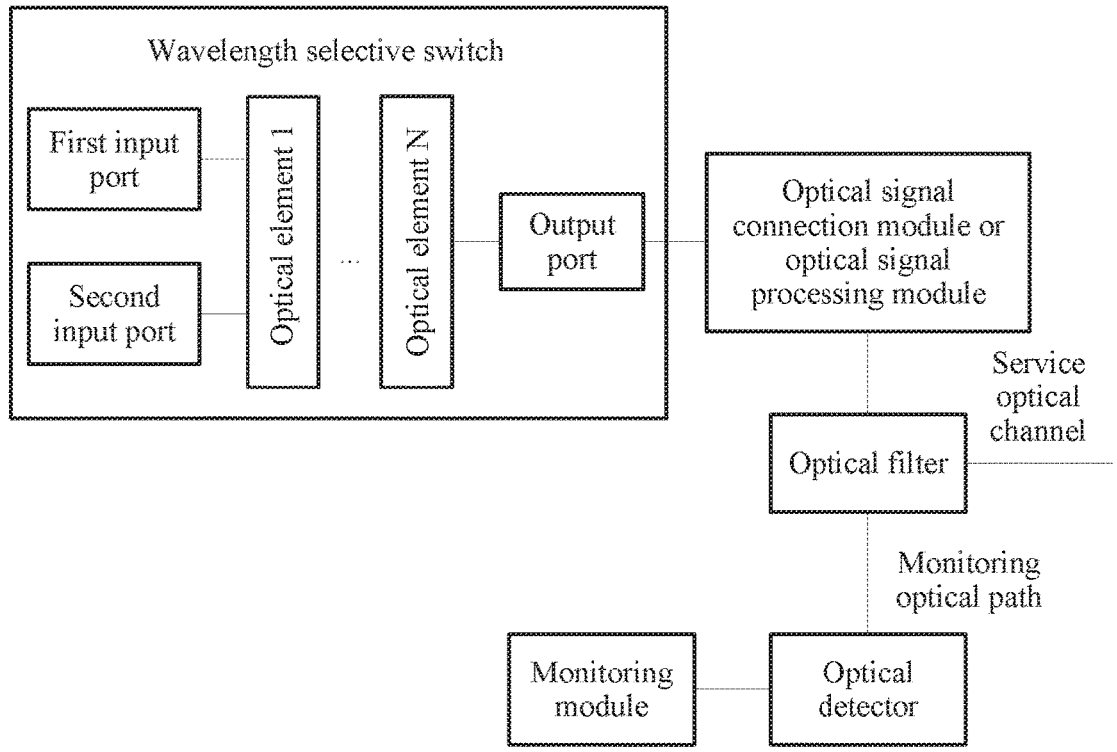
FIG. 5 is a schematic diagram of a connection manner of externally connecting an optical signal connection module or an optical signal processing module to a wavelength selective switch according to an embodiment of the present invention.

Further, referring to FIG. 5, in some embodiments of the present invention, the output port of the wavelength selective switch is connected to an optical signal connection module, or the output port of the wavelength selective switch is connected to an optical signal processing module.

The optical signal connection module or the optical signal processing module is connected to an optical filter.

The optical filter is configured to: receive, from the optical signal connection module, the service optical signal and the monitoring optical signal that are output by the optical signal connection module, or receive, from the optical signal processing module, the service optical signal and the monitoring optical signal that are processed by the optical signal processing module, split the received service optical signal from the received monitoring optical signal, and output the split monitoring optical signal.

In some embodiments of the present invention, after being processed by the at least one optical element, the service optical signal and the monitoring optical signal may be output by using a same output port. As shown in FIG. 5, the output port of the wavelength selective switch is connected to the optical signal connection module or the optical signal processing module, and the optical signal connection module or the optical signal processing module is connected to the optical filter. The optical filter is configured to: receive, by using the optical signal connection module or the optical signal processing module, the service optical signal processed by the at least one optical element and the monitoring optical signal processed by the at least one optical element, split the received service optical signal from the received monitoring optical signal, and output the split monitoring optical signal. The split monitoring optical signal that is output may be used for monitoring performance of the optical signal connection module or the optical signal processing module. In some embodiments of the present invention, a optical detector is further connected to the wavelength selective switch and is configured to detect an insertion loss of the wavelength selective switch. After the optical filter split the received service optical signal from the received monitoring optical signal, the optical detector is configured to detect an insertion loss of the wavelength selective switch and the optical signal connection module or the optical signal processing module, and an insertion loss of the optical signal connection module or the optical signal processing module may be obtained by performing subtraction on the two insertion losses.

As shown in FIG. 3, FIG. 4, or FIG. 5, in some embodiments of the present invention, the wavelength selective switch further includes the optical detector and a monitoring module. The optical detector is connected to the last optical element of the at least one optical element, and the monitoring module is connected to the optical detector.

The optical detector is configured to perform optical power detection on the monitoring optical signal processed by the at least one optical element, to obtain an optical power detection value of the monitoring optical signal.

The monitoring module is configured to: obtain the optical power detection value of the monitoring optical signal from the optical detector, obtain a flare central location of the monitoring optical signal according to the optical power detection value of the monitoring optical signal, compare the flare central location of the monitoring optical signal with a preset flare central initial location, to determine a central frequency offset of the wavelength selective switch, and compensate for the central frequency offset of the wavelength selective switch.

In the foregoing embodiment of the present invention, the wavelength selective switch further includes the optical detector and the monitoring module. The optical detector may detect optical power of the monitoring optical signal, so as to obtain the optical power detection value of the monitoring optical signal. The monitoring module obtains the optical power detection value of the monitoring optical signal from the optical detector, and obtains the flare central location of the monitoring optical signal according to the optical power detection value of the monitoring optical signal. An example in which the optical element disposed in the wavelength selective switch is specifically an LCOS device is used for description, and there are two methods for determining the flare central location of the monitoring optical signal. A first method is: The monitoring laser transmits multiple monitoring optical signals of different wavelengths at different times, these monitoring optical signals are separately incident onto the LCOS device on which a same phase grating that has a narrowband filtering effect is loaded, and the optical detector is used to separately measure power values of various monitoring optical signals of different wavelengths, so as to obtain power distribution based on different wavelengths. A peak wavelength in the power distribution is corresponding to a flare central location of the monitoring optical signal. A second method is: The monitoring laser transmits monitoring optical signals of a same wavelength, a phase grating that has a narrowband filtering effect for different central wavelengths is loaded on the LCOS device at different times, and the optical detector is used to separately measure power values of the monitoring optical signals, so as to obtain power distribution based on different pixels. A peak pixel location in the power distribution is corresponding to a flare central location of the monitoring optical signal. An initial value is recorded when the optical wavelength selective switch is installed, and after the wavelength selective switch runs for a period of time, monitoring and detection are performed on the wavelength selective switch, to obtain a flare central location of the monitoring optical signal at this time. If the location at this time is the same as an original initial value location, it indicates that a waveform is not changed after the optical signal passes through the wavelength selective switch, and compensation is not required; or if the location at this time is different from an original initial value location, it may be deduced that a waveform has been changed after the optical signal passes through the wavelength selective switch, and the central frequency offset of the wavelength selective switch needs to be compensated for.

Further, in some embodiments of the present invention, the monitoring module is further configured to send a frequency offset prompt message when the central frequency offset exceeds a frequency offset threshold. The monitoring module may further determine whether the central frequency offset of the wavelength selective switch exceeds a preset frequency offset threshold, and may send the frequency offset prompt message when the central frequency offset exceeds the frequency offset threshold. The frequency offset threshold may be determined according to a central frequency offset error range that is tolerable for the wavelength selective switch. In this embodiment of the present invention, the optical detector and the monitoring module are disposed in the wavelength selective switch, so that a central frequency offset monitoring function and an alarm indication function of the wavelength selective switch may be implemented. For example, the monitoring module sends an alarm prompt message to an upper layer control system of the wavelength selective switch, so that the upper layer control system can quickly determine a central frequency offset fault of the wavelength selective switch, and maintainability of the wavelength selective switch is improved.

In some embodiments of the present invention, as shown in FIG. 3, FIG. 4, or FIG. 5, the monitoring module is further configured to: obtain the optical power detection value of the monitoring optical signal from the optical detector, and compare the optical power detection value of the monitoring optical signal with an optical power initial value of the monitoring optical signal that is input to the wavelength selective switch, to determine an insertion loss of the wavelength selective switch. The monitoring module may be configured to: not only detect the central frequency offset of the wavelength selective switch, but also detect the insertion loss of the wavelength selective switch according to the optical power detection value that is of the monitoring optical signal and that is obtained by the optical detector. The insertion loss of the wavelength selective switch is a difference between the optical power detection value and the optical power initial value that are of the monitoring optical signal.

Further, in some embodiments of the present invention, the monitoring module is further configured to send an insertion loss prompt message when the insertion loss exceeds an insertion loss threshold. The monitoring module may further determine whether the insertion loss of the wavelength selective switch exceeds a preset insertion loss threshold, and may send the insertion loss prompt message when the insertion loss of the wavelength selective switch exceeds the insertion loss threshold. The insertion loss threshold may be determined according to an insertion loss error range that is tolerable for the wavelength selective switch. In this embodiment of the present invention, the optical detector and the monitoring module are disposed in the wavelength selective switch, so that an insertion loss monitoring function and an alarm indication function of the wavelength selective switch may be implemented. For example, the monitoring module sends an alarm prompt message to an upper layer control system of the wavelength selective switch, so that the upper layer control system can quickly determine an insertion loss fault of the wavelength selective switch, and maintainability of the wavelength selective switch is improved.

In the foregoing embodiment of the present invention, the foregoing performance detection is performed on the monitoring optical signal processed by the at least one optical element. The service optical signal and the monitoring optical signal are successively input to a same optical element in the wavelength selective switch, and therefore, the service optical signal does not need to be analyzed, and the optical performance of the wavelength selective switch may be obtained by analyzing the monitoring optical signal. Therefore, by analyzing the monitoring optical signal that is output by the wavelength selective switch, the performance of the wavelength selective switch can be monitored when no service optical signal is input.

In some embodiments of the present invention, as shown in FIG. 3, the output port of the wavelength selective switch may include output ports of two types: the first output port and the second output port. The service optical signal processed by the at least one optical element is output by using the first output port, and the monitoring optical signal processed by the at least one optical element is output by using the second output port. With reference to the foregoing example, it can be learned that the optical detector and the monitoring module are disposed in the wavelength selective switch. Further, the optical detector is connected to the second output port, and the optical detector may obtain, by using the second output port, the monitoring optical signal processed by the at least one optical element.

An example for description is provided below. The at least one optical element is separately connected to the first output port and the second output port, and the service optical signal processed by the at least one optical element and the monitoring optical signal processed by the at least one optical element may be respectively output by using different output ports. If the monitoring optical signal processed by the at least one optical element is output by using the second output port, the monitoring optical signal processed by the at least one optical element may be obtained from the second output port, and then the performance of the wavelength selective switch may be monitored by monitoring and analyzing the monitoring optical signal.

It can be learned from the foregoing embodiment used as an example for describing the present invention, that the monitoring optical signal transmitted by the monitoring laser is input to the at least one optical element in the wavelength selective switch, so that both the monitoring optical signal and the service optical signal are input to the at least one optical element. The optical element performs same optical signal processing on the service optical signal and the monitoring optical signal, so that an optical performance change of the wavelength selective switch may be analyzed according to a result of detecting the monitoring optical signal. In this embodiment of the present invention, monitoring the performance of the wavelength selective switch does not depend on inputting of the service optical signal, and therefore, the performance of the wavelength selective switch can be monitored when no service optical signal is input to the wavelength selective switch.

The wavelength selective switch provided in the present invention is described in the foregoing embodiment, and monitoring performance of an optical signal connection module or an optical signal processing module in an optical signal transmission system is described below. The optical signal connection module is specifically an optical module that is connected to a first wavelength selective switch and a second wavelength selective switch. An optical signal that is output by the first wavelength selective switch may be input to the second wavelength selective switch after being forwarded by the optical signal connection module. The optical signal processing module may be specifically an optical module that processes an input optical signal according to a function of the optical signal processing module and outputs the optical signal. A specific type and performance specification of the optical signal connection module or the optical signal processing module are not limited in this embodiment of the present invention, and any optical signal connection module or optical signal processing module whose performance needs to be monitored may be disposed in the optical signal transmission system. For example, the optical signal connection module may be an optical back plane (OBP). In addition to including the optical signal connection module or the optical signal processing module, the optical signal transmission system may further include two wavelength selective switches: the first wavelength selective switch and the second wavelength selective switch. The first wavelength selective switch and the second wavelength selective switch are specifically the wavelength selective switch described in the foregoing embodiment, and the wavelength selective switch described in the foregoing embodiment is any wavelength selective switch in FIG. 1 to FIG. 5.

Figure 6:
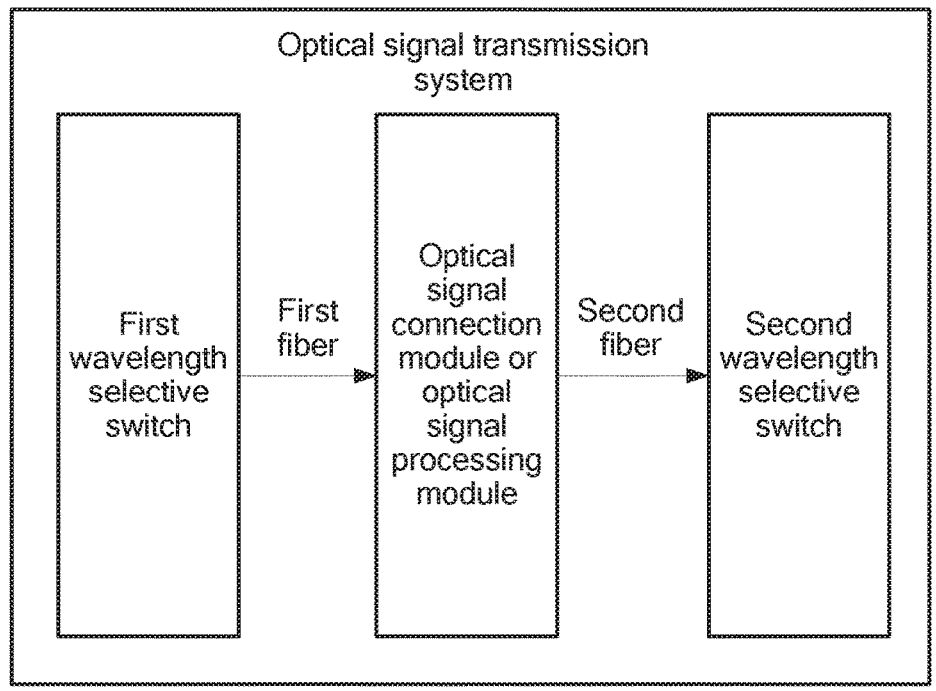
FIG. 6 is a schematic block diagram of a compositional structure of an optical signal transmission system according to an embodiment of the present invention.

In an optical signal transmission system provided in an embodiment of the present invention, as shown in FIG. 6, performance of an optical signal connection module or an optical signal processing module may be monitored by using a first wavelength selective switch and a second wavelength selective switch. The optical signal transmission system includes: the first wavelength selective switch, the second wavelength selective switch, and the optical signal connection module, or the optical signal transmission system includes: the first wavelength selective switch, the second wavelength selective switch, and the optical signal processing module. The first wavelength selective switch and the second wavelength selective switch are any wavelength selective switch in FIG. 1 to FIG. 5.

The optical signal connection module is separately connected to the first wavelength selective switch and the second wavelength selective switch, or the optical signal processing module is separately connected to the first wavelength selective switch and the second wavelength selective switch.

The optical signal connection module is connected to the first wavelength selective switch by using a first fiber, and is connected to the second wavelength selective switch by using a second fiber, or the optical signal processing module is connected to the first wavelength selective switch by using a first fiber, and is connected to the second wavelength selective switch by using a second fiber.

A service optical signal transmitted by a service laser is input to the first wavelength selective switch, a first monitoring optical signal transmitted by a first monitoring laser is input to the first wavelength selective switch, and after being successively processed by the first wavelength selective switch, the optical signal connection module or the optical signal processing module, and the second wavelength selective switch, the service optical signal is output by using the second wavelength selective switch.

Quantities of input ports and quantities of output ports of the first wavelength selective switch and the second wavelength selective switch may be flexibly set according to an actual scenario. A quantity of input ports of the first wavelength selective switch may be the same as or different from a quantity of input ports of the second wavelength selective switch. Likewise, a quantity of output ports of the first wavelength selective switch may be the same as or different from a quantity of output ports of the second wavelength selective switch.

The optical signal transmission system provided in this embodiment of the present invention includes two wavelength selective switches in total. The first wavelength selective switch and the second wavelength selective switch are connected to each other by using the optical signal connection module or the optical signal processing module.

Figure 7:
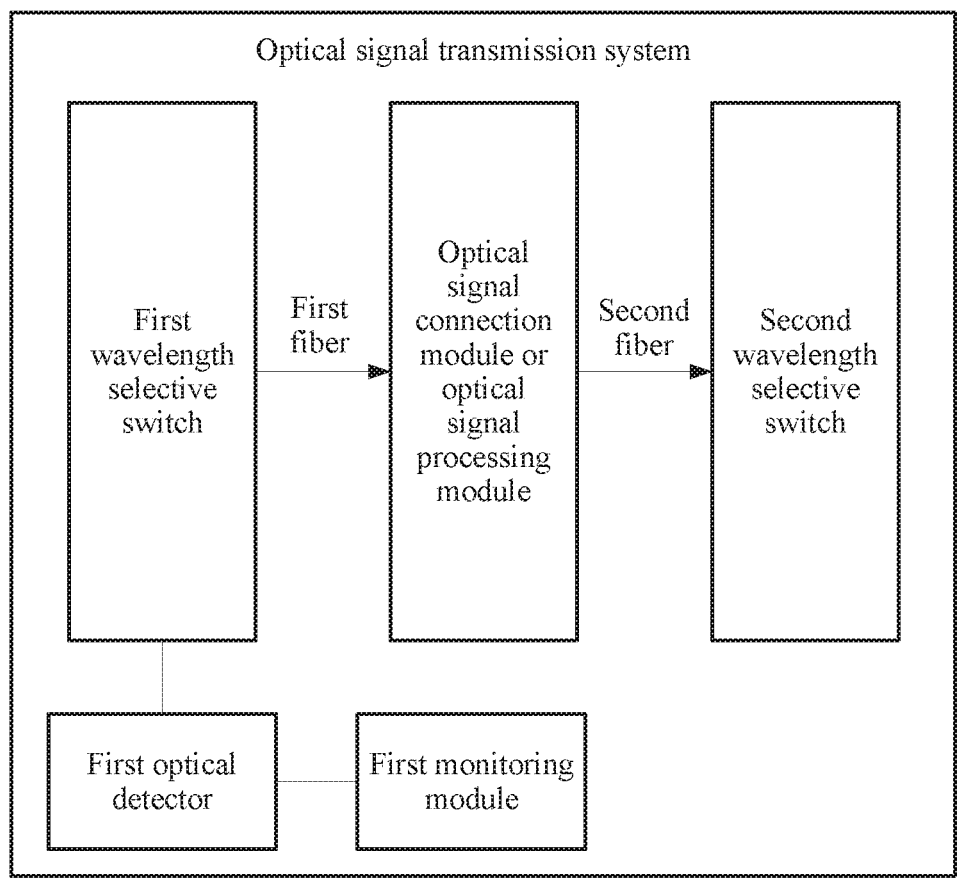
FIG. 7 is a schematic block diagram of a compositional structure of another optical signal transmission system according to an embodiment of the present invention.

In some embodiments of the present invention, referring to FIG. 7, the optical signal transmission system further includes a first optical detector and a first monitoring module.

The first optical detector is configured to: obtain, from the first wavelength selective switch, a first monitoring optical signal processed by the first wavelength selective switch, and perform optical power detection on the first monitoring optical signal processed by the first wavelength selective switch, to obtain a first optical power detection value of the first monitoring optical signal.

The first monitoring module is configured to: obtain the first optical power detection value of the first monitoring optical signal from the first optical detector, obtain a flare central location of the first monitoring optical signal according to the first optical power detection value of the first monitoring optical signal, compare the flare central location of the first monitoring optical signal with a preset flare central initial location, to determine a central frequency offset of the first wavelength selective switch, and compensate for the central frequency offset of the first wavelength selective switch.

Further, in some embodiments of the present invention, the first monitoring module is further configured to: obtain the first optical power detection value of the first monitoring optical signal from the first optical detector, and compare the first optical power detection value of the first monitoring optical signal with an optical power initial value of the first monitoring optical signal that is input to the first wavelength selective switch, to determine an insertion loss of the first wavelength selective switch.

For detailed description of functions of the first optical detector and the first monitoring module, refer to the description of the optical detector and the monitoring module in FIG. 3, FIG. 4, or FIG. 5 in the foregoing embodiment.

It should be noted that in this embodiment of the present invention, the first monitoring laser is configured to transmit the first monitoring optical signal to the first wavelength selective switch. The first monitoring laser is disposed in the optical signal transmission system, and the first monitoring laser may be disposed inside the first wavelength selective switch, or may be disposed outside the first wavelength selective switch.

Figure 8:
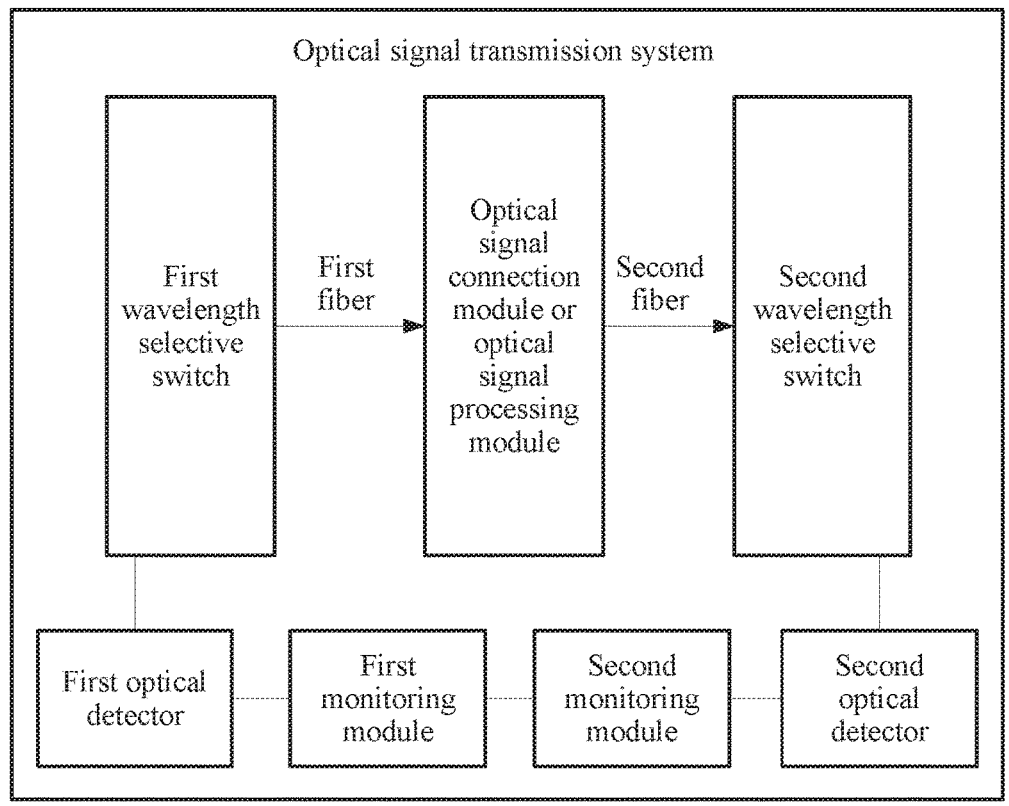
FIG. 8 is a schematic block diagram of a compositional structure of another optical signal transmission system according to an embodiment of the present invention.

In some embodiments of the present invention, referring to FIG. 8, the optical signal transmission system further includes a second optical detector and a second monitoring module.

The second optical detector is configured to: obtain, from an output port of the second wavelength selective switch, a second monitoring optical signal processed by the second wavelength selective switch, where the second monitoring optical signal is transmitted to the second wavelength selective switch by a second monitoring laser, and perform optical power detection on the second monitoring optical signal processed by the second wavelength selective switch, to obtain an optical power detection value of the second monitoring optical signal.

The second monitoring module is configured to: obtain the optical power detection value of the second monitoring optical signal from the second optical detector, and compare the optical power detection value of the second monitoring optical signal with an optical power initial value of the second monitoring optical signal that is input to the second wavelength selective switch, to determine an insertion loss of the second wavelength selective switch.

For detailed description of functions of the second optical detector and the second monitoring module, refer to the description of the optical detector and the monitoring module in FIG. 3, FIG. 4, or FIG. 5 in the foregoing embodiment.

It should be noted that in this embodiment of the present invention, the second monitoring laser is configured to transmit the second monitoring optical signal to the second wavelength selective switch. The second monitoring laser is disposed in the optical signal transmission system, and the second monitoring laser may be disposed inside the second wavelength selective switch, or may be disposed outside the second wavelength selective switch.

Further, in some embodiments of the present invention, when the optical signal transmission system further includes the first optical detector and the first monitoring module, a communication connection is established between the first monitoring module and the second monitoring module.

The first monitoring module is further configured to send the insertion loss of the first wavelength selective switch to the second monitoring module.

The second optical detector is further configured to: obtain, from the second wavelength selective switch, a first monitoring optical signal that is successively processed by the first wavelength selective switch, the optical signal connection module or the optical signal processing module, and the second wavelength selective switch, and perform optical power detection on the first monitoring optical signal that is successively processed by the first wavelength selective switch, the optical signal connection module or the optical signal processing module, and the second wavelength selective switch, to obtain a second optical power detection value of the first monitoring optical signal.

The second monitoring module is further configured to: obtain, from the first optical detector, the second optical power detection value of the first monitoring optical signal, compare the second optical power detection value of the first monitoring optical signal with the optical power initial value of the first monitoring optical signal that is input to the first wavelength selective switch, to determine a total insertion loss of the first monitoring optical signal, where the total insertion loss of the first monitoring optical signal includes an insertion loss that is generated after processing performed by the first wavelength selective switch, the optical signal connection module or the optical signal processing module, and the second wavelength selective switch, and calculate an insertion loss of the optical signal connection module or the optical signal processing module according to the total insertion loss of the first monitoring optical signal, the insertion loss of the first wavelength selective switch, and the insertion loss of the second wavelength selective switch.

In the foregoing embodiment of the present invention, the first monitoring module is connected to the second monitoring module, so that the second monitoring module may obtain the insertion loss of the first wavelength selective switch from the first monitoring module, and the second monitoring module calculates the insertion loss of the optical signal connection module or the optical signal processing module according to the total insertion loss of the first monitoring optical signal, the insertion loss of the first wavelength selective switch, and the insertion loss of the second wavelength selective switch. Specifically, the total insertion loss of the first monitoring optical signal is a total insertion loss generated after the first monitoring optical signal enters the optical signal transmission system and passes through all elements in the system, and then the insertion loss of the optical signal processing module may be obtained by separately subtracting the insertion loss of the first wavelength selective switch and the insertion loss of the second wavelength selective switch from the total insertion loss of the first monitoring optical signal, so as to quickly determine a fault of the optical signal connection module or the optical signal processing module, and improve maintainability of the optical signal transmission system.

An example for description is provided below. In an actual application scenario, the first wavelength selective switch may be a WSS, the second wavelength selective switch may be an add/drop wavelength selective switch (ADWSS), the optical signal connection module may be specifically an optical back plane, and the WSS needs to be connected to the ADWSS in a high density manner by using the optical back plane. In the optical signal transmission system provided in this embodiment of the present invention, a function of monitoring performance of the optical back plane when no service optical signal is transmitted may be provided, so that no extra device is required for monitoring.

To better understand and implement the foregoing solutions in this embodiment of the present invention, the following uses a corresponding application scenario as an example for detailed description.

A new solution for implementing a WSS module is provided in an embodiment of the present invention. A monitoring optical signal and a service optical signal share an optical element in the WSS module, so that performance compensation and monitoring alarm for the WSS module are implemented by detecting the monitoring optical signal, and reliability of the WSS module and an optical signal transmission system is improved.

Figure 9:
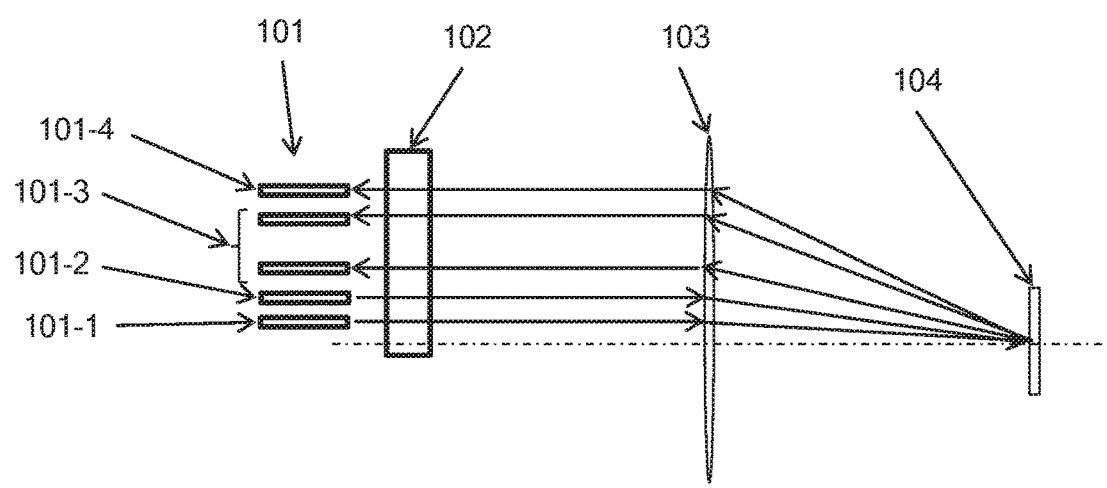
FIG. 9 is a schematic diagram of a process of optical signal transmission in a port direction of a wavelength selective switch according to an embodiment of the present invention.

Referring to FIG. 9, FIG. 9 is a schematic diagram of a process of optical signal transmission in a port direction of a wavelength selective switch according to an embodiment of the present invention. To resolve a prior-art problem that a WSS module cannot be monitored when no service optical signal is input, the present invention provides a solution in which a small area for implementing monitoring and feedback functions is added to an edge of a liquid crystal on silicon (LCOS) or micro-electro-mechanical system (MEMS) chip. For ease of description, it is assumed that a port direction (that is, an arrangement direction of different fibers) of the WSS module is in an X direction, a wavelength direction (that is, a diffraction separation direction of different rays service light) of the WSS module is in a Y direction, and an optical signal is transmitted in a Z direction (that is, a beam transmission direction). As shown in FIG. 9, on an XZ plane, an input port of the WSS includes a first input port and a second input port, and an output port includes a first output port and a second output port. For example, the first input port is corresponding to a fiber 101-1, the first output port is corresponding to a fiber 101-3, the second input port is corresponding to a fiber 101-2, and the second output port is corresponding to a fiber 101-4. After passing through the fiber 101-1, an input service optical signal becomes parallel light after passing through a beam processing subsystem 102, the parallel light is incident onto a lens 103, and focuses onto a surface of an LCOS or an MEMS 104 after being converged by the lens. After being diffracted by an LCOS phase grating or being reflected by the MEMS at different angles, the light successively passes through the lens 103 and the beam processing subsystem 102 again, and focuses onto the different output fiber ports 101-3, to be output after coupling. Unlike an existing WSS module, the WSS module provided in this embodiment of the present invention includes two special fibers 101-2 and 101-4. The fiber 101-2 connects to a monitoring optical signal, and the monitoring optical signal and a service optical signal are processed by a same optical element, that is, the service optical signal passes through the beam processing subsystem 102, the lens 103, and the LCOS or the MEMS 104, and then passes through the LCOS or the MEMS 104, the lens 103, and the beam processing subsystem 102, to be output, and the monitoring optical signal passes through the beam processing subsystem 102, the lens 103, and the LCOS or the MEMS 104, and then passes through the LCOS or the MEMS 104, the lens 103, and the beam processing subsystem 102, to be output. Therefore, same optical path processing is performed on the service optical signal and the monitoring optical signal. With a specific LCOS phase grating or an MEMS angle, the monitoring optical signal is output from the 101-4 fiber port after coupling, and then the monitoring optical signal enters a optical detector. For example, the optical detector may be configured to detect power of the monitoring optical signal.

Figure 10:
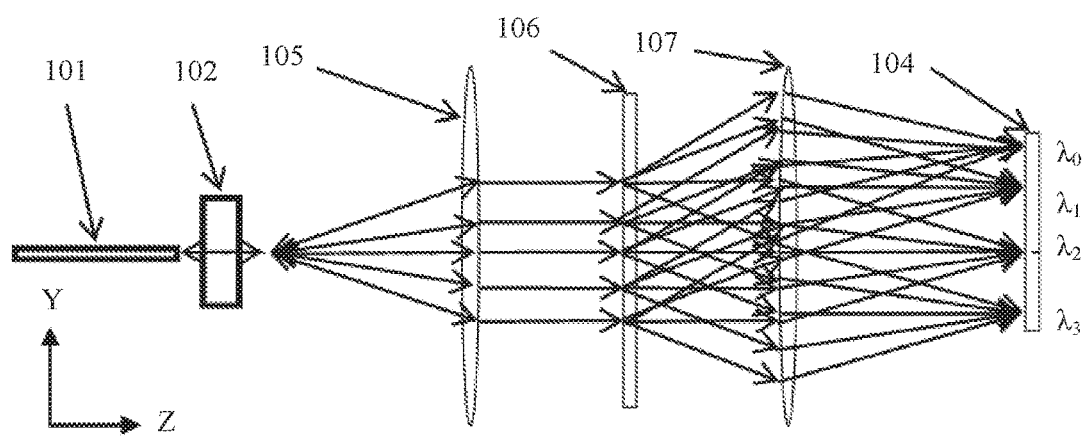
FIG. 10 is a schematic diagram of a process of optical signal transmission in a wavelength direction of a wavelength selective switch according to an embodiment of the present invention.
Figure 11:
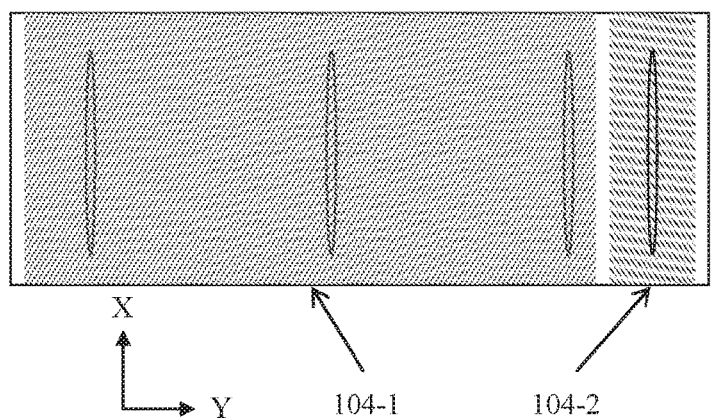
FIG. 11 is a schematic diagram of flare distribution on an LCOS or an MEMS of a wavelength selective switch according to an embodiment of the present invention.

On a YZ plane, as shown in FIG. 10, FIG. 10 is a schematic diagram of a process of optical signal transmission in a wavelength direction of a wavelength selective switch according to an embodiment of the present invention. After passing through a beam processing subsystem 102 and a lens 105, input light 101-1 or 101-2 becomes parallel light and is incident onto a diffraction grating 106, and light of different wavelengths (such as $\lambda_0$, $\lambda_1$, $\lambda_2$, and $\lambda_3$ shown in the figure) is split in space after being diffracted by the diffraction grating, and then is incident onto a surface of an LCOS or an MEMS 104 after being converged by a lens 107. After being diffracted by an LCOS phase grating or being reflected by the MEMS at different angles, the light focuses onto different output fiber ports 101-3 and 101-4 after successively passing through the lens 107, the diffraction grating 106, the lens 105, and the beam processing subsystem 102, to be output after coupling. Unlike a prior-art WSS module, in the WSS module provided in this embodiment of the present invention, the LCOS is divided into two areas, or the MEMS is divided into two areas. As shown in FIG. 11, FIG. 11 is a schematic diagram of flare distribution on an LCOS or an MEMS of a wavelength selective switch according to an embodiment of the present invention. A left area 104-1 is a service light area that successively separates different service optical signals; and a right area 104-2 is a monitoring light area, and a monitoring optical signal from a monitoring fiber 101-2 falls only on the small area. A wavelength of the monitoring optical signal is beyond a wavelength range of the service optical signal. For example, for 96 optical signals of different wavelengths, a wavelength different from those of 96 service optical signals may be selected as the wavelength of the monitoring optical signal, so that the flare distribution shown in FIG. 11 may be implemented on an LCOS or MEMS plane in the WSS.

Further, the WSS module provided in this embodiment of the present invention has a second input port and a second output port, so as to implement the WSS module with a monitoring function. The WSS module in the present invention may implement the following two special functions. The first special function is compensation for a central frequency offset of the WSS module and alarm. There are two methods for monitoring a central frequency offset of the WSS module. One method is using a monitoring laser with high stability (for example, wavelength accuracy is less than 0.5 GHz), a value change of a measured wavelength is obtained by means of scanning in a monitoring area in a wavelength direction, a location of the monitoring optical signal in the monitoring area may be measured by means of scanning, and a wavelength change may be obtained according to two different locations and by means of conversion. The other method is fixing a phase of a specific column of pixels of an LCOS in the monitoring area or an angle of a specific small mirror of an MEMS, and a value change of a wavelength corresponding to the fixed location is obtained by means of calculation by scanning a wavelength of monitoring light in a small range, for example, it may be detected that locations of the LCOS are different, a different maximum power wavelength is found by scanning a wavelength of detection light, and then an offset of a central frequency is obtained by performing subtraction. Monitoring light and service light pass through a same optical element and are distributed in a fixed relationship on the LCOS or MEMS plane. Therefore, a change in wavelength location of the monitoring optical signal is equivalent to a change in wavelength location of the service optical signal, and finally, the obtained change in wavelength location is fed back to a control algorithm of the WSS module, so that the central frequency offset of the WSS module may be compensated for, and performance of WSS is improved. In addition, if the value change in wavelength obtained by means of calculation exceeds a specific value (for example, an absolute value is greater than 5 GHz), when supplementation is performed, such information may be fed back by using WSS control software to upper layer software for timely alarm prompt.

An example for description is provided below. As shown in FIG. 11, in the monitoring light area 104-2, a phase grating is loaded column by column by using software. For example, the 104-2 is in a section between a $1850^{th}$ pixel to a $1900^{th}$ pixel, one phase grating is first loaded on a $1850^{th}$ column, and a grayscale value is set for a $1851^{st}$ column to a $1900^{th}$ column; then one phase grating is loaded on the $1851^{st}$ column, and a grayscale value is set for the $1850^{th}$ column and a $1852^{nd}$ column to the $1900^{th}$ column; by analogy, one phase grating is finally loaded on the $1900^{th}$ column, and a grayscale value is set for the $1850^{th}$ column to a $1899^{th}$ column; and power values based on different loaded images are separately measured by using a optical detector, so that power distribution based on different pixels is obtained. A peak pixel location of the power distribution is corresponding to a flare central location of the monitoring light. An initial value (for example, at a $1875^{th}$ pixel) is recorded in a system when a wavelength selective switch is installed, and after the system runs for a period of time, monitoring and detection are performed on the WSS module, to obtain a flare central location of the monitoring light at this time. If the location at this time is the same as an original initial value location, a waveform in the module is not changed, and compensation is not required; and if the location at this time is different from an original initial value location (for example, changed to be at a $1876^{th}$ pixel), it may be deduced that a waveform in the module has been changed, and the waveform in the module needs to be compensated for.

The monitoring optical signal and the service optical signal pass through a same optical element, and therefore, when the waveform in the module is changed, it may be approximately considered that a same pixel location change occurs in a flare central location of the service optical signal and a flare central location of the monitoring optical signal. Therefore, when the flare central location of the monitoring optical signal is changed, it means that the waveform in the module (including the monitoring optical signal and the service optical signal) moves by a same pixel value in a same direction as a whole. Therefore, in terms of an algorithm, the waveform in the module may be aligned with a wavelength of the service optical signal simply by moving images in 104-1 and 104-2 by the same pixel value in the same direction. For example, when the flare central location of the monitoring optical signal is changed from the $1875^{th}$ pixel to the $1876^{th}$ pixel, the images in the 104-1 and 104-2 need to be moved by one pixel in a same direction as a whole, so that compensation for a waveform frequency offset can be implemented.

The second special function, that is, implementing compensation for an insertion loss of the WSS module and alarm, that may be implemented by the WSS module in the present invention is described below. Likewise, the monitoring optical signal and the service optical signal pass through the same optical element in the WSS module, and therefore, long-term deterioration of insertion loss (that is, reduction of optical power) of the service optical signal may be presented by insertion loss deterioration of the monitoring optical signal. In addition, similarly, when the insertion loss deteriorates to an extent (for example, greater than 2 dB), such information may be fed back by using the WSS control software to the upper layer software for timely alarm prompt.

Figure 12:
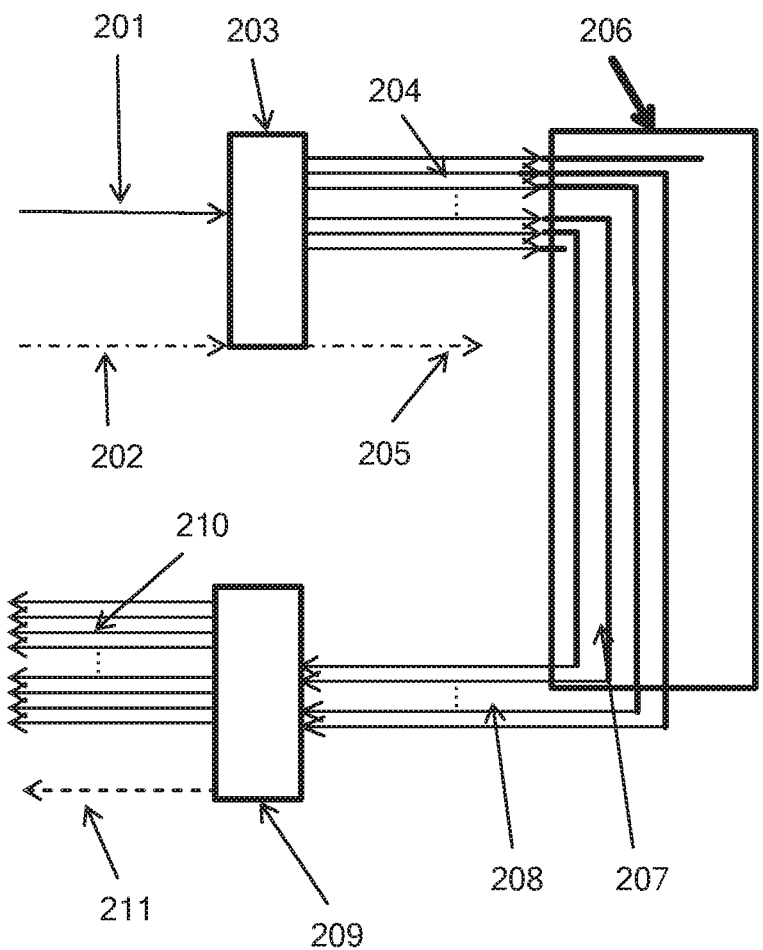
FIG. 12 is a schematic diagram of monitoring performance of an optical back plane in an optical signal transmission system according to an embodiment of the present invention.

The foregoing embodiment is for monitoring the performance of the WSS module. In addition, the solution provided in the embodiments of the present invention may be applied to an optical signal transmission system, so as to monitor another optical module or optical path in the optical signal transmission system. Referring to FIG. 12. FIG. 12 is a schematic diagram of monitoring performance of an optical back plane in an optical signal transmission system according to an embodiment of the present invention. This monitoring optical signal may be used for long-term monitoring on the performance of the optical back plane. For using a WSS module 203 provided in this embodiment of the present invention, a service optical signal connection fiber 201, a monitoring optical signal connection fiber 202, and a fiber group 204 are different signal output ends, and a optical detector connection fiber 205 is configured to measure the monitoring optical signal so as to provide feedback. Then, the monitoring optical signal may be output from the fiber group 204 by loading different phase gratings in a monitoring area of an LCOS or setting different angles for small mirrors of an MEMS. The monitoring optical signal is combined with a service optical signal, and the monitoring optical signal and the service optical signal are input to an input fiber port 208 in an ADWSS module 209 by using a connection cable 207 in an optical back plane 206 in a cabinet. In the ADWSS module, a same method may be used for outputting the monitoring optical signal to a monitoring port 211, and the monitoring optical signal is finally detected by the optical detector whereas the service optical signal is output from an output port 210. The optical detector connection fiber 205 may be used for outputting the service optical signal, or may be used for outputting the monitoring optical signal. According to this solution, a system may perform long-term monitoring on performance of different optical links in the optical back plane. In addition, the monitoring optical signal and the service optical signal are split, and therefore in this solution, even when no service exists in some ports of the WSS module, the system may determine a performance status of each optical link in the optical back plane according to an insertion loss change of the monitoring optical signal, so as to provide timely alarm and feedback.

According to the technical solution in the present invention, a monitoring optical signal outside a communication channel is introduced into an existing WSS module, and after passing through the same optical element, the monitoring optical signal is output to a specific output port to be detected. An optical performance change of the WSS module is deduced according to a detection result, and then compensation and alarm are performed. Monitoring light outside the communication channel is introduced into the existing WSS module, the monitoring optical signal is switched to different output ports, and after the monitoring optical signal passes through other hardware (such as an OBP) in an optical cabinet, detection is performed, so as to deduce an optical performance change of other hardware. Therefore, according to this embodiment of the present invention, a performance indicator of the WSS module can be improved, an alarm indication is added, a speed of locating a network fault is increased, and maintainability of a network is improved. In addition, the present invention may be used for monitoring performance of other hardware (such as an OBP connection), so that a speed of locating a network fault is increased, and maintainability of a network is improved.

It should be noted that, for brevity of description, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables.

Based on the description of the foregoing implementations, a person skilled in the art may clearly understand that the present invention may be implemented by software in addition to necessary universal hardware, or by dedicated hardware, including a dedicated integrated circuit, a dedicated component, and the like.

In conclusion, the foregoing embodiments are merely used for describing the technical solutions in the present invention, but not for limiting the present invention.

What is claimed is:

1. A wavelength selective switch, wherein at least one optical element is disposed in the wavelength selective switch, and the at least one optical element is successively arranged in the wavelength selective switch according to a sequence of processing optical signals;

a service optical signal transmitted by a service laser and a monitoring optical signal transmitted by a monitoring laser are separately input to the at least one optical element, and a wavelength of the service optical signal and a wavelength of the monitoring optical signal are different;

the at least one optical element is configured to: receive the service optical signal from the service laser, receive the monitoring optical signal from the monitoring laser, and perform same optical signal processing on the service optical signal and the monitoring optical signal according to a processing function of the at least one optical element, to obtain the service optical signal processed by the at least one optical element and the monitoring optical signal processed by the at least one optical element; and the service optical signal processed by the at least one optical element and the monitoring optical signal processed by the at least one optical element are output, wherein the monitoring optical signal processed by the at least one optical element is used for monitoring performance of the wavelength selective switch.

2. The wavelength selective switch according to claim 1, wherein the wavelength selective switch comprises a first input port and a second input port;
the first input port and the second input port are separately connected to a first optical element of the at least one optical element; and
the service optical signal transmitted by the service laser is input to the first optical element of the at least one optical element by using the first input port, and the monitoring optical signal transmitted by the monitoring laser is input to the first optical element of the at least one optical element by using the second input port.

3. The wavelength selective switch according to claim 1, wherein the wavelength selective switch has an input port, a first optical element of the at least one optical element is connected to the input port, and the input port is connected to an optical filter;
the service optical signal transmitted by the service laser and the monitoring optical signal transmitted by the monitoring laser are separately input to the optical filter; and
the optical filter is configured to: after receiving the service optical signal and the monitoring optical signal, send the service optical signal and the monitoring optical signal to the first optical element of the at least one optical element by using the input port.

4. The wavelength selective switch according to claim 1, wherein the wavelength selective switch comprises a first output port and a second output port, and a last optical element of the at least one optical element is connected to the first output port and the second output port; and
the service optical signal processed by the at least one optical element is output by using the first output port, and the monitoring optical signal processed by the at least one optical element is output by using the second output port.

5. The wavelength selective switch according to claim 1, wherein the wavelength selective switch has an output port, and a last optical element of the at least one optical element is connected to the output port; and
the service optical signal processed by the at least one optical element and the monitoring optical signal processed by the at least one optical element are output by using the output port.

6. The wavelength selective switch according to claim 5, wherein the output port of the wavelength selective switch is connected to an optical signal connection module, or the output port of the wavelength selective switch is connected to an optical signal processing module;
the optical signal connection module or the optical signal processing module is connected to an optical filter; and
the optical filter is configured to: receive, from the optical signal connection module, the service optical signal and the monitoring optical signal that are output by the optical signal connection module, or receive, from the optical signal processing module, the service optical signal and the monitoring optical signal that are processed by the optical signal processing module, split the received service optical signal from the received monitoring optical signal, and output the split monitoring optical signal.

7. The wavelength selective switch according to claim 1, wherein the wavelength selective switch further comprises a optical detector and a monitoring module, the optical detector is connected to the last optical element of the at least one optical element, and the monitoring module is connected to the optical detector;
the optical detector is configured to perform optical power detection on the monitoring optical signal processed by the at least one optical element, to obtain an optical power detection value of the monitoring optical signal; and
the monitoring module is configured to: obtain the optical power detection value of the monitoring optical signal from the optical detector, obtain a flare central location of the monitoring optical signal according to the optical power detection value of the monitoring optical signal, compare the flare central location of the monitoring optical signal with a preset flare central initial location, to determine a central frequency offset of the wavelength selective switch, and compensate for the central frequency offset of the wavelength selective switch.

8. The wavelength selective switch according to claim 7, wherein the monitoring module is further configured to send a frequency offset prompt message when the central frequency offset exceeds a frequency offset threshold.

9. The wavelength selective switch according to claim 7, wherein the monitoring module is further configured to: obtain the optical power detection value of the monitoring optical signal from the optical detector, and compare the optical power detection value of the monitoring optical signal with an optical power initial value of the monitoring optical signal that is input to the wavelength selective switch, to determine an insertion loss of the wavelength selective switch.

10. The wavelength selective switch according to claim 9, wherein the monitoring module is further configured to send an insertion loss prompt message when the insertion loss exceeds an insertion loss threshold.

11. An optical signal transmission system, wherein the optical signal transmission system comprises a first wavelength selective switch, a second wavelength selective switch, and an optical signal connection module, or the optical signal transmission system comprises a first wavelength selective switch, a second wavelength selective switch, and an optical signal processing module;
the optical signal connection module is separately connected to the first wavelength selective switch and the second wavelength selective switch, or the optical signal processing module is separately connected to the first wavelength selective switch and the second wavelength selective switch;
the optical signal connection module is connected to the first wavelength selective switch by using a first fiber, and is connected to the second wavelength selective switch by using a second fiber, or the optical signal processing module is connected to the first wavelength selective switch by using a first fiber, and is connected to the second wavelength selective switch by using a second fiber; and a service optical signal transmitted by a service laser is input to the first wavelength selective switch, a first monitoring optical signal transmitted by a first monitoring laser is input to the first wavelength selective switch, and after being successively processed by the first wavelength selective switch, the optical signal connection module or the optical signal processing module, and the second wavelength selective switch, the service optical signal is output by using the second wavelength selective switch, wherein the first wavelength selective switch and the second wavelength selective switch are a wavelength selective switch, wherein at least one optical element is disposed in the wavelength selective switch, and the at least one optical element is successively arranged in the wavelength selective switch according to a sequence of processing optical signals;

a service optical signal transmitted by a service laser and a monitoring optical signal transmitted by a monitoring laser are separately input to the at least one optical element, and a wavelength of the service optical signal and a wavelength of the monitoring optical signal are different;

the at least one optical element is configured to: receive the service optical signal from the service laser, receive the monitoring optical signal from the monitoring laser, and perform same optical signal processing on the service optical signal and the monitoring optical signal according to a processing function of the at least one optical element, to obtain the service optical signal processed by the at least one optical element and the monitoring optical signal processed by the at least one optical element; and the service optical signal processed by the at least one optical element and the monitoring optical signal processed by the at least one optical element are output, wherein the monitoring optical signal processed by the at least one optical element is used for monitoring performance of the wavelength selective switch.

12. The optical signal transmission system according to claim 11, wherein the optical signal transmission system further comprises a first optical detector and a first monitoring module, wherein the first optical detector is configured to: obtain, from the first wavelength selective switch, a first monitoring optical signal processed by the first wavelength selective switch, and perform optical power detection on the first monitoring optical signal processed by the first wavelength selective switch, to obtain a first optical power detection value of the first monitoring optical signal; and the first monitoring module is configured to: obtain the first optical power detection value of the first monitoring optical signal from the first optical detector, obtain a flare central location of the first monitoring optical signal according to the first optical power detection value of the first monitoring optical signal, compare the flare central location of the first monitoring optical signal with a preset flare central initial location, to determine a central frequency offset of the first wavelength selective switch, and compensate for the central frequency offset of the first wavelength selective switch.

13. The optical signal transmission system according to claim 11, wherein the first monitoring module is further configured to: obtain a first optical power detection value of the first monitoring optical signal from the first optical detector, and compare the first optical power detection value of the first monitoring optical signal with an optical power initial value of the first monitoring optical signal that is input to the first wavelength selective switch, to determine an insertion loss of the first wavelength selective switch.

14. The optical signal transmission system according to claim 11, wherein the optical signal transmission system further comprises a second optical detector and a second monitoring module, wherein the second optical detector is configured to: obtain, from the second wavelength selective switch, a second monitoring optical signal processed by the second wavelength selective switch, wherein the second monitoring optical signal is transmitted to the second wavelength selective switch by a second monitoring laser, and perform optical power detection on the second monitoring optical signal processed by the second wavelength selective switch, to obtain an optical power detection value of the second monitoring optical signal; and the second monitoring module is configured to: obtain the optical power detection value of the second monitoring optical signal from the second optical detector, and compare the optical power detection value of the second monitoring optical signal with an optical power initial value of the second monitoring optical signal that is input to the second wavelength selective switch, to determine an insertion loss of the second wavelength selective switch.

15. The optical signal transmission system according to claim 14, wherein when the optical signal transmission system further comprises the first optical detector and the first monitoring module, the first monitoring module establishes a communication connection to the second monitoring module;

the first monitoring module is further configured to send the insertion loss of the first wavelength selective switch to the second monitoring module;

the second optical detector is further configured to: obtain, from the second wavelength selective switch, a first monitoring optical signal that is successively processed by the first wavelength selective switch, the optical signal connection module or the optical signal processing module, and the second wavelength selective switch, and perform optical power detection on the first monitoring optical signal that is successively processed by the first wavelength selective switch, the optical signal connection module or the optical signal processing module, and the second wavelength selective switch, to obtain a second optical power detection value of the first monitoring optical signal; and the second monitoring module is further configured to: obtain, from the first optical detector, the second optical power detection value of the first monitoring optical signal, compare the second optical power detection value of the first monitoring optical signal with the optical power initial value of the first monitoring optical signal that is input to the first wavelength selective switch, to determine a total insertion loss of the first monitoring optical signal, wherein the total insertion loss of the first monitoring optical signal comprises an insertion loss that is generated after processing performed by the first wavelength selective switch, the optical signal connection module or the optical signal processing module, and the second wavelength selective switch, and calculate an insertion loss of the optical signal connection module or the optical signal processing module according to the total insertion loss of the first monitoring optical signal, the insertion loss of the first wavelength selective switch, and the insertion loss of the second wavelength selective switch.

* * * * *